United States Patent
Mu

(10) Patent No.: US 10,952,293 B1
(45) Date of Patent: Mar. 16, 2021

(54) CURRENT ADJUSTMENT CIRCUIT

(71) Applicant: MAXIC TECHNOLOGY CORPORATION, Beijing (CN)

(72) Inventor: Zaixin Mu, Beijing (CN)

(73) Assignee: MAXIC TECHNOLOGY CORPORATION, Beijing (CN)

( * ) Notice: Subject to any disclaimer, the term of this patent is extended or adjusted under 35 U.S.C. 154(b) by 0 days.

(21) Appl. No.: 16/862,800

(22) Filed: Apr. 30, 2020

(30) Foreign Application Priority Data

Dec. 31, 2019 (CN) .......................... 201911420034.5

(51) Int. Cl.
*H05B 45/10* (2020.01)
*H05B 45/37* (2020.01)
*H05B 47/16* (2020.01)

(52) U.S. Cl.
CPC ............. *H05B 45/10* (2020.01); *H05B 45/37* (2020.01); *H05B 47/16* (2020.01)

(58) Field of Classification Search
CPC ......... H05B 45/10; H05B 45/37; H05B 47/16
See application file for complete search history.

(56) References Cited

U.S. PATENT DOCUMENTS

| | | | | |
|---|---|---|---|---|
| 2010/0019889 A1* | 1/2010 | Braunshtein | ......... | H05B 47/185 315/159 |
| 2010/0090618 A1* | 4/2010 | Veltman | ................. | H05B 45/40 315/307 |
| 2010/0283391 A1* | 11/2010 | Braunshtein | ......... | H05B 47/185 315/127 |
| 2015/0250034 A1* | 9/2015 | Esaki | .................... | H02M 3/156 315/186 |

* cited by examiner

*Primary Examiner* — Raymond R Chai
(74) *Attorney, Agent, or Firm* — Metis IP LLC

(57) ABSTRACT

The present disclosure provides a current adjustment circuit. The current adjustment circuit may include a dimming switch coupled to an inductor disposed in a lighting sub-circuit, a zero-crossing detector, and a time control sub-circuit. The dimming switch may be configured to control power supply states of the inductor. The zero-crossing detector may be configured to detect an ending time of a current of the inductor, and to generate a zero-crossing signal. The time control sub-circuit may include a first capacitor and a second capacitor and configured to receive the zero-crossing signal, and generate a control signal that is configured to control the dimming switch to initiate a switching cycle for the inductor. The switching cycle may start after a delay time and the delay time is controlled by a first charging time of the first capacitor and a second charging time of the second capacitor.

20 Claims, 11 Drawing Sheets

CURRENT ADJUSTMENT CIRCUIT

CROSS-REFERENCE TO RELATED APPLICATION

This application claims priority to Chinese Patent Application No. 201911420034.5 filed on Dec. 31, 2019, the contents of which are incorporated herein by reference in their entirety.

TECHNICAL FIELD

The present disclosure relates to the field of an electrical circuit, and more particularly relates to a current adjustment circuit.

BACKGROUND

LED (light-emitting diode) light source is a light source based on a light-emitting diode. The LED light source has a plurality of advantages, such as, supporting low-voltage power supply, low energy consumption, wide applicability, high stability, short response time, no harm upon the environment, and multi-colors light emission. With continuous development of LED technology, LED light sources have been widely used in shopping malls, factories, and housings. The LED light sources are used for lighting or decoration, and brightness of the LED light sources is adjusted according to user needs. Normally, the LED is driven by a constant current, its brightness varies with the current flow through the LED string.

Driving methods of LED light source mainly include CCM (Continuous Conduction Mode) and DCM (Discontinuous Conduction Mode). In CCM dimming, the current of an inductor does not reach zero during one switching cycle, that is, the inductor does not "reset". Cost of the CCM dimming is high and the CCM dimming is difficult to be controlled for an inductor saturation is prone to occur. In DCM dimming, current of an inductor is properly reset during one switching cycle. The current of the inductor is zero when a power switch is turned on. Therefore, DCM control can easily realize dimming control. However, there are many factors that affect the inductive current in DCM control, such as bus voltage, inductive inductance, the voltage of LED etc. In the case of a plurality of LED light sources are in a circuit, the LED light sources have poor consistency, resulting in a large difference between dimming effects of the LED light sources. Therefore, how to effectively adjust brightness of a light and enhance the consistency of LED light sources has become an urgent problem to be solved.

SUMMARY

In a first aspect of the present disclosure, a circuit for adjusting current is provided. The circuit may include a dimming switch, a lighting sub-circuit, a zero-crossing detector, and a time control sub-circuit. The dimming switch may be coupled to an inductor disposed in the lighting sub-circuit. The dimming switch may be configured to control power supply states of the inductor. The zero-crossing detector may be configured to detect an ending time of a current of the inductor, and to generate a zero-crossing signal. The time control sub-circuit may include a first capacitor and a second capacitor. The time control sub-circuit may be configured to receive the zero-crossing signal, and to generate a control signal that is configured to control the dimming switch to initiate a switching cycle for the inductor. The switching cycle may start after a delay time. The delay time may be controlled by a first charging time of the first capacitor and a second charging time of the second capacitor.

In some embodiments, an average current through the lighting sub-circuit may be based on a first ratio of the delay time and the switching cycle.

In some embodiments, a luminous intensity of a light source in the lighting sub-circuit may be based on the average current through the lighting sub-circuit.

In some embodiments, the first capacitor may be charged by a first current source and the second capacitor may be charged by a second current source. The ratio of first delay time and the switching cycle may be based on a second ratio of a first current of the first current source and a second current of the second current source.

In some embodiments, the second current source may include a plurality of current mirrors corresponding to a plurality of switches, and the second ratio of the first current and the second current may be controlled by the plurality of switches.

In some embodiments, the circuit may further include a first comparator. The first comparator may be configured to compare a second voltage of the second capacitor with a first voltage of the first capacitor. In response to a determination that the second voltage is equal to the first voltage, the second current source may stop charging the second capacitor.

In some embodiments, the delay time may be equal to a difference of the first charging time of the first capacitor and the second charging time of the second capacitor.

In some embodiments, the circuit may further include a discharge sub-circuit. The discharge sub-circuit may be configured to control discharging of the first capacitor and the second capacitor.

In some embodiments, the circuit may further include a resistor disposed between the dimming switch and the ground, and a second comparator configured to compare a third voltage of the resistor with a reference voltage. In response to a determination that the third voltage is equal to the reference voltage, the dimming switch may switch to turn off.

In some embodiments, the dimming switch may include an N-channel Metal Oxide Semiconductor.

In some embodiments, the circuit may further include a converter. The converter may be configured to determine the second current of the second current source based on a dimming signal.

In a second aspect of the present disclosure, a method for adjusting a current of a lighting sub-circuit is provided. The method may include detecting an ending time of a current of an inductor disposed in the lighting sub-circuit and generating a zero-crossing signal with a zero-crossing detector; and in response to the zero-crossing signal, generating, with a time control sub-circuit, a control signal that is configured to control a dimming switch to initiate a switching cycle for the inductor. The time control sub-circuit may have a first capacitor and a second capacitor. The switching cycle may start after a delay time. The delay time may be controlled by a first charging time of the first capacitor and a second charging time of the second capacitor.

In some embodiments, an average current through the lighting sub-circuit may be based on the first ratio of the delay time and the switching cycle.

In some embodiments, a luminous intensity of a light source in the lighting sub-circuit may be based on the average current through the lighting sub-circuit.

In some embodiments, the method may further include comparing a second voltage of the second capacitor with a first voltage of the first capacitor; and stopping charging the second capacitor when the second voltage is equal to the first voltage.

In some embodiments, the delay time may be equal to a difference of the first charging time of the first capacitor and the second charging time of the second capacitor.

In some embodiments, the method may further include controlling, by a discharge sub-circuit, discharging of the first capacitor and the second capacitor.

In some embodiments, the method may further include comparing a third voltage of a resistor disposed between the dimming switch and the ground with a reference voltage; and switching off the dimming switch when the third voltage is equal to the reference voltage.

In some embodiments, the dimming switch may include an N-channel Metal Oxide Semiconductor.

In some embodiments, the method may further include determining, by a converter, the second current of the second current source based on a dimming signal.

Supplement features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
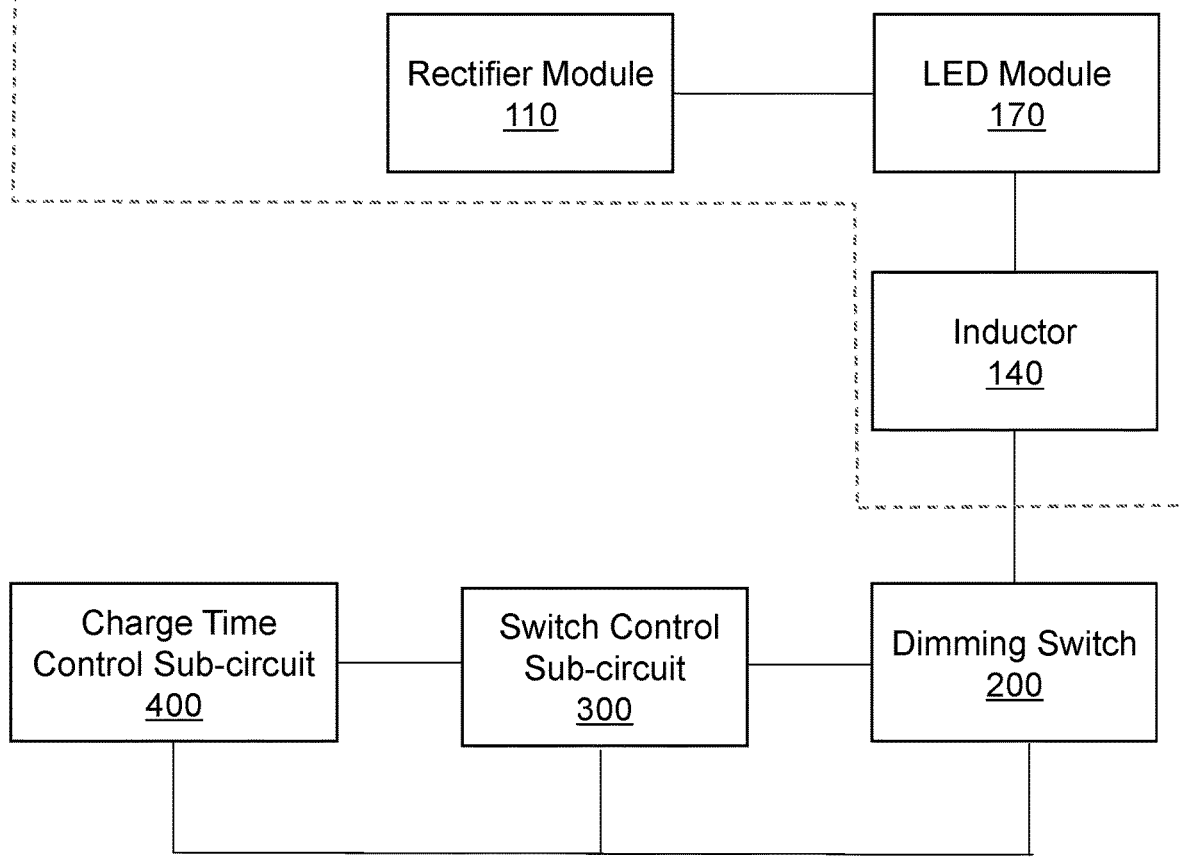
FIG. 1 is a schematic structural diagram illustrating an exemplary current adjustment circuit according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, steps, elements, and/or components, but do not preclude the presence or addition of one or more other features, integers, steps, steps, elements, components, and/or groups thereof.

It will be understood that the term "system," "engine," "module," "unit," and/or "block" used herein are one method to distinguish different components, elements, parts, sections, or assembly of different levels in ascending order. However, the terms may be displaced by another expression if they achieve the same purpose.

These and other features, and characteristics of the present disclosure, as well as the methods of step and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

In order to make objectives, technical solutions, and advantages of the present disclosure more apparent, the technical solutions in the present disclosure will be clearly and completely described below in conjunction with reference drawings in the present disclosure. It is apparent that the described embodiments are only a part of the embodiments of the present disclosure, and not all of them. The components in embodiments of the present disclosure, which are generally described and illustrated in the figures herein, may be arranged and designed in a variety of different configurations. Therefore, detailed description of the embodiments of the present disclosure, which is provided in the reference drawings, is not intended to limit the scope of the present disclosure, but only the selected embodiments of the present disclosure. Based on the embodiments of the present disclosure, each of the other embodiments obtained by those skilled in the art without creative efforts shall be bound to the scope of the present disclosure.

Figure 4A:
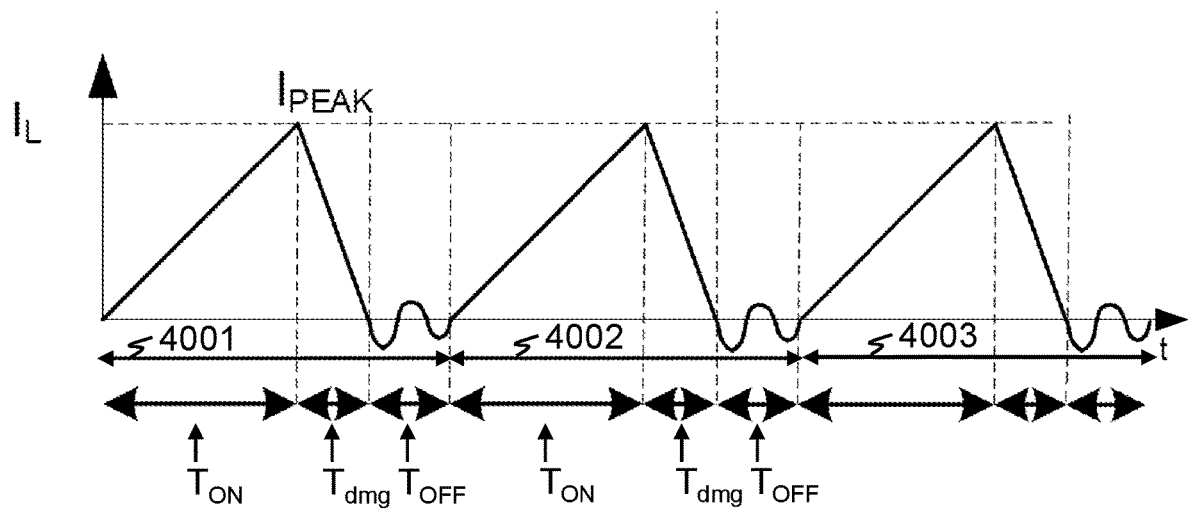
FIGS. 4A and 4B are timing diagrams illustrating switching cycles of an exemplary current adjustment circuit according to some embodiments of the present disclosure.

Embodiments of the present disclosure provide a current adjustment circuit for an LED light source of which a switching cycle is controllable. The switching cycle of the current adjustment circuit may be controlled by adjusting a zero-crossing period in the switching cycle under a control of a time control sub-circuit and a switch control sub-circuit. By adjusting a first ratio of the zero-crossing period and the switching cycle, an average current through the LED light source and a luminous intensity of the LED light source may be controlled. The time control sub-circuit may include a first capacitor charged by a first current source and a second capacitor charged by a second current source. In some embodiments, capacitances of the first capacitor and the second capacitor may be the same. By adjusting a second ratio of a first current of the first current source and a second current of the second current source, the first ratio of the zero-crossing period and the switching cycle may be controlled. In some embodiments, capacitances of the first capacitor and the second capacitor may be different. The first ratio of the zero-crossing period and the switching cycle may also be adjusted by controlling charging times of the first capacitor and the second capacitor. By using such a controlling mechanism, the effect of parasitic parameters on the LED light source may be reduced. Consistency of each LED light source in the current adjustment circuit may be enhanced. As used herein, the average current through the LED light source may be an average current through an inductor (e.g., inductor 140). Under a DCM dimming mode, the current through the inductor may be a periodic signal. As is known to all, an average signal of a periodic steady state signal may be equal to an average signal in a particular cycle of the periodic steady state signal. That is to say, the average current through the inductor may be equal to an average current in a particular cycle (e.g., switching cycle 4001 as shown in FIG. 4A).

FIG. 1 is a schematic structural diagram illustrating an exemplary current adjustment circuit 10 according to some embodiments of the present disclosure. As shown in FIG. 1, the current adjustment circuit 10 may include a lighting sub-circuit 100, a dimming switch 200, a switch control sub-circuit 300, and a charge time control sub-circuit 400.

The dimming switch 200 may be connected to the lighting sub-circuit 100, the switch control sub-circuit 300, and the charge time control sub-circuit 400. The dimming switch 200 may be configured to control conduction states of the lighting sub-circuit 100. The lighting sub-circuit 100 may include a rectifying module 110, an inductor 140, and a LED module 170.

The charge time control sub-circuit 400 may be connected to the switch control sub-circuit 300 for sending a first control signal $V_{SET}$ to the switch control sub-circuit 300. The charge time control sub-circuit 400 may be connected to the dimming switch 200 for receiving a control end signal $V_{GATE}$ of the dimming switch 200 (i.e., the first switch 201 shown in FIG. 5). The charge time control sub-circuit 400 may be configured to send the first control signal $V_{SET}$ to the switch control sub-circuit 300 after a preset time period from a start time of a zero-crossing state of the inductor 140. The start time of the zero-crossing state of the inductor 140 may also refer to an ending time of a current of the inductor 140. The first control signal $V_{SET}$ may be configured to control switching states of the dimming switch 200.

The switch control sub-circuit 300 may be configured to control the switching states of the dimming switch 200. For example, the switch control sub-circuit 300 may be configured to turn off the dimming switch 200 based on a comparison between a voltage $V_{CS}$ of a source end of the dimming switch 200 and a reference voltage $V_{REF1}$. For another example, the switch control sub-circuit 300 may be configured to turn on the dimming switch 200 after received the first control signal $V_{SET}$ from the charge time control sub-circuit 400.

The current adjustment circuit 10 provided by embodiments of the present disclosure may control time of a zero-crossing state of the inductor 140 (i.e., adjust a duty ratio of a current of the inductor 140), thereby an average output current of the current adjustment circuit 10 and a luminous intensity of a light source in the current adjustment circuit 10 may be adjusted. As used herein, a zero-crossing state is a state when a current of the inductor 140 is zero or oscillating around zero. The zero-crossing state may also refer to a zero-crossing damped oscillation state. By using the current adjustment circuit 10 provided by embodiments of the present disclosure, the luminous intensity of the light source with more than one sub light sources (e.g., more than one LEDs) may be adjusted at the same time, and consistency of each of the more than one sub light sources may be improved.

Figure 2:
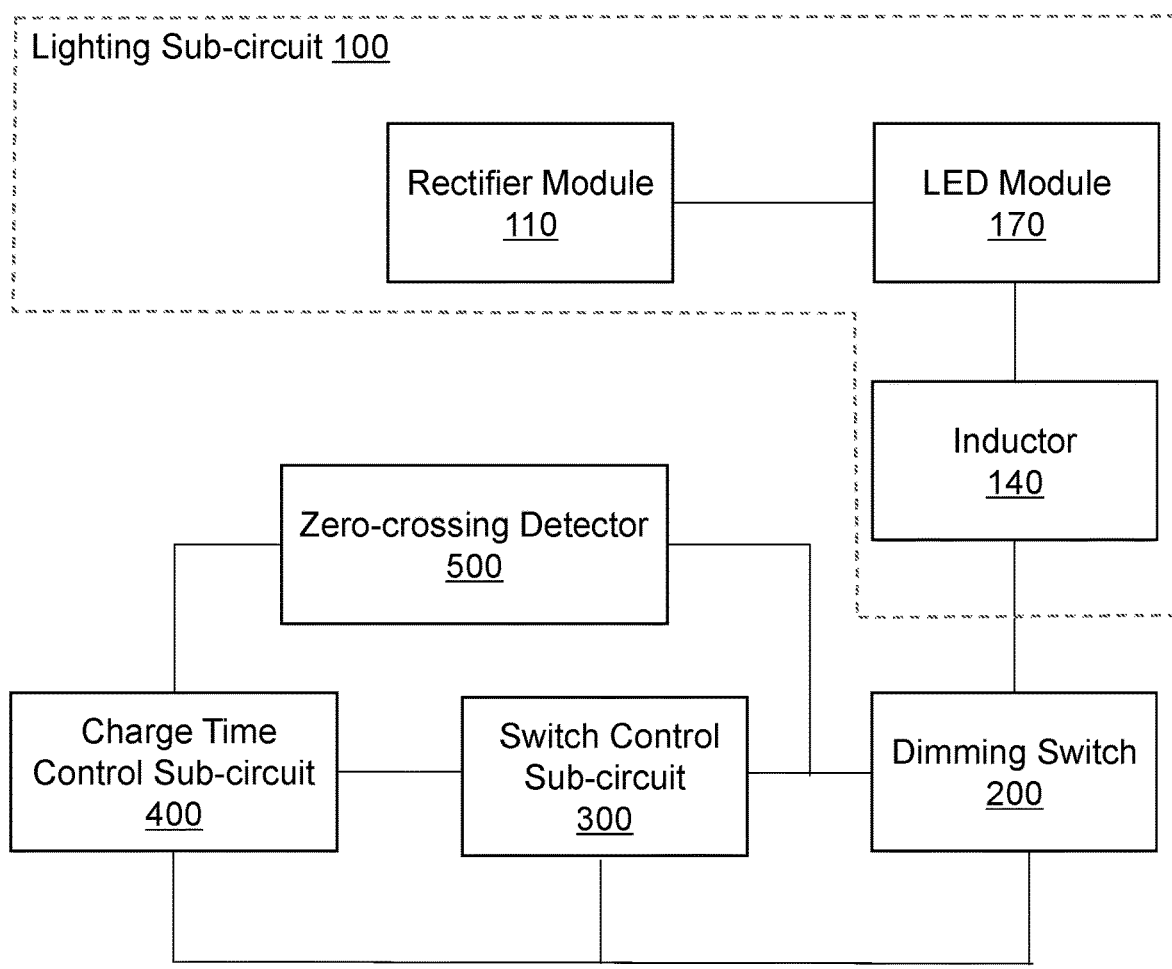
FIG. 2 is a schematic structural diagram illustrating an exemplary current adjustment circuit according to some embodiments of the present disclosure.

FIG. 2 is a schematic structural diagram illustrating an exemplary current adjustment circuit 10 according to some embodiments of the present disclosure. The current adjustment circuit 10 may include the lighting sub-circuit 100, the dimming switch 200, the switch control sub-circuit 300, the charge time control sub-circuit 400, and a zero-crossing detector 500. More descriptions regarding the lighting sub-circuit 100, the dimming switch 200, the switch control sub-circuit 300, and the charge time control sub-circuit 400 may be found elsewhere in the present disclosure. See, e.g., FIG. 1 and relevant descriptions thereof.

The zero-crossing detector 500 may be connected to the dimming switch 200 and the charge time control sub-circuit 400. The zero-crossing detector 500 may be configured to perform a zero-crossing detection corresponding to the inductor 140. For example, the zero-crossing detector 500 may be connected to a gate (i.e., control terminal) of the dimming switch 200 and detect an oscillating signal. If the inductor 140 is fully discharged, the oscillating signal may be generated at the drain of the dimming switch 200 and be detected by the zero-crossing detector 500 at the gate of the dimming switch 200. Detection of the oscillating signal may indicate that a current of the inductor 140 becomes zero. At a time of the detection of the oscillating signal, the zero-crossing detector 500 may send a second control signal $V_{ZCD}$ to the charge time control sub-circuit 400. After a preset time period of receiving the second control signal $V_{ZCD}$, the charge time control sub-circuit 400 may generate the first control signal $V_{SET}$ and send the first control signal $V_{SET}$ to the switch control sub-circuit 300 for controlling the dimming switch 200 to switch off. The preset time period may be a time period between time of receiving the second control signal $V_{ZCD}$ and time of outputting the first control signal $V_{SET}$.

Descriptions of embodiments of the present disclosure about the zero-crossing detector 500, which are provided in the reference drawings, are not intended to limit the scope of the present disclosure, but only selected embodiments of the present disclosure. Based on the embodiments of the present disclosure, each of the other embodiments obtained by those skilled in the art without creative efforts shall be bound to the scope of the present disclosure.

Figure 3A:
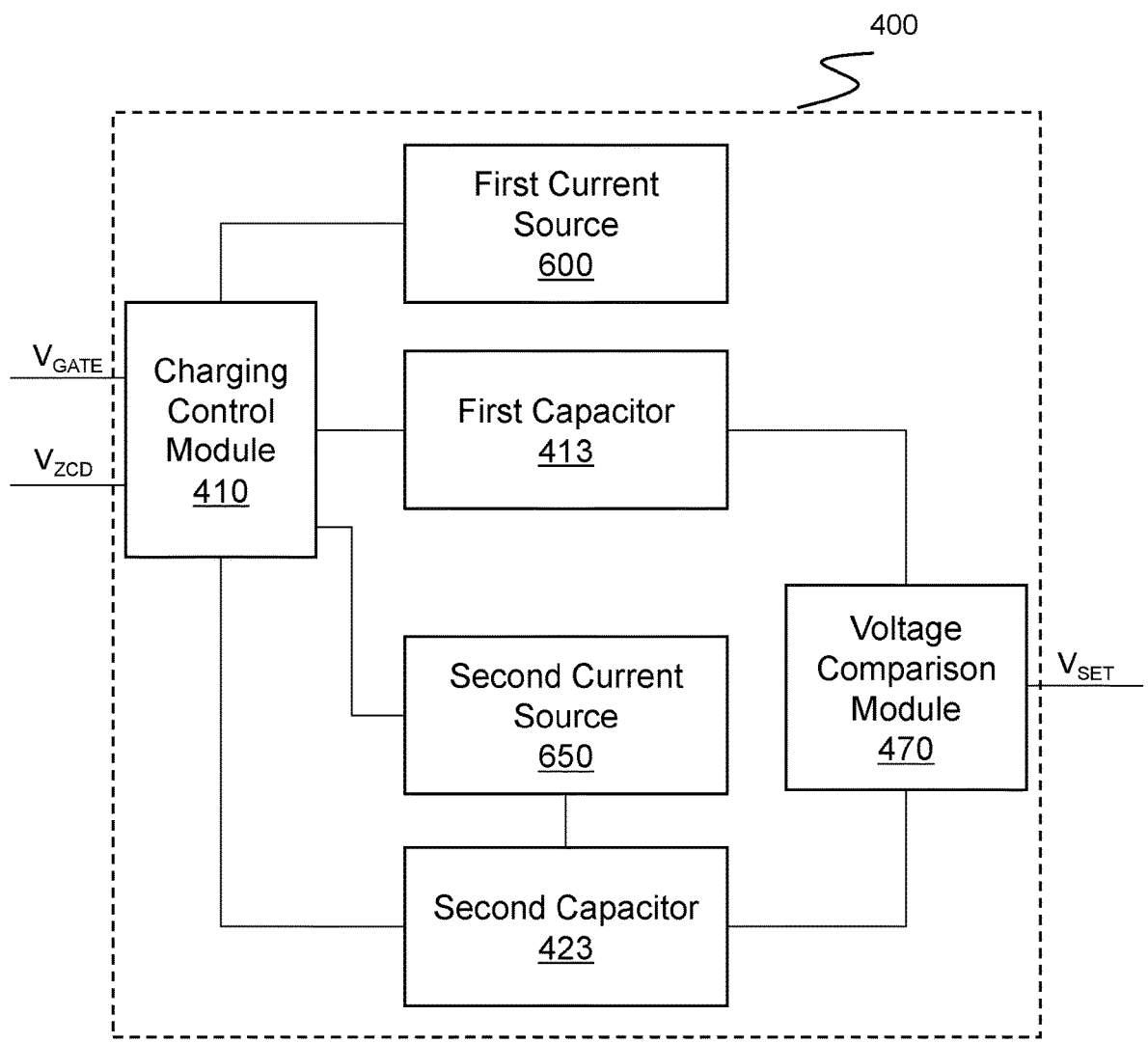
FIG. 3A is a schematic structural diagram illustrating an exemplary charge time control sub-circuit according to some embodiments of the present disclosure.
Figure 3B:
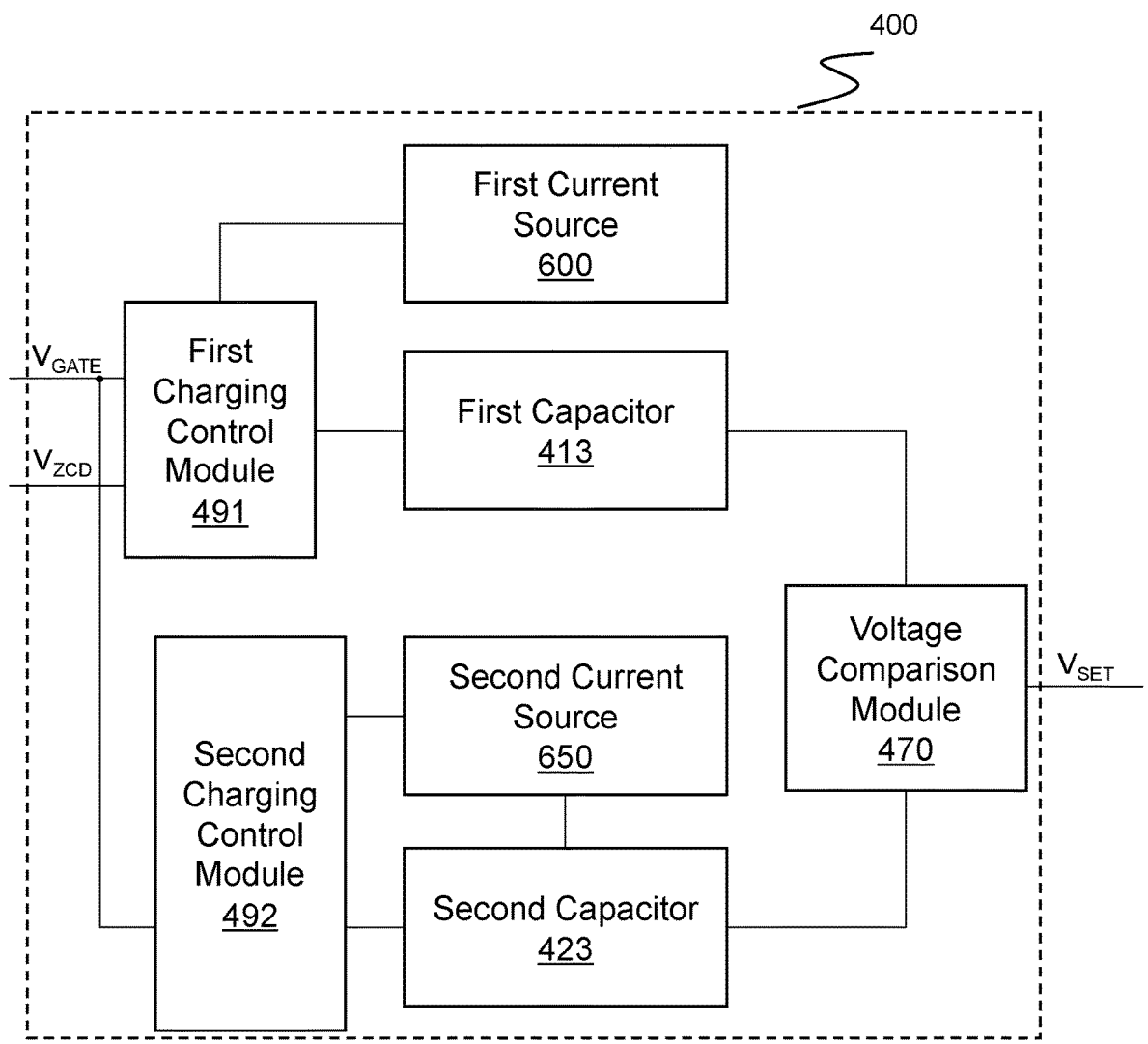
FIG. 3B is a schematic structural diagram illustrating an exemplary charge time control sub-circuit according to some embodiments of the present disclosure.

FIGS. 3A and 3B are schematic structural diagrams illustrating an exemplary charge time control sub-circuit 400 according to some embodiments of the present disclosure. As shown in FIG. 3A, the charge time control sub-circuit 400 may include a first current source 600, a second current source 650, a first capacitor 413, a second capacitor 423, a charging control module 410, and a voltage comparison module 470. A current of the first current source 600 may be preset. A current of the second current source 650 may be adjustable according to a dimming signal.

The charging control module 410 may be configured to receive a control terminal signal $V_{GATE}$ of the dimming switch 200 and a second control signal $V_{ZCD}$. The control terminal signal $V_{GATE}$ may be a high level signal or parasitic a low level signal. If a current passing through the dimming switch 200 is zero (i.e., the dimming switch 200 is in a non-conduction state), the control terminal signal $V_{GATE}$ may be determined as a low level signal. If the current passing through the dimming switch 200 is not zero (e.g., the dimming switch 200 is in a conduction state), the control terminal signal $V_{GATE}$ may be determined as a high level signal. The second control signal $V_{ZCD}$ may be outputted by the zero-crossing detector 500 when the zero-crossing detector 500 detects the oscillating signal at the gate (i.e., the control terminal) of the dimming switch 200.

The charging control module 410 may be connected to the first current source 600 and the first capacitor 413 for controlling charging states of the first capacitor 413. For example, the charging control module 410 may be configured to control the first current source 600 to charge the first capacitor 413 if the control terminal signal $V_{GATE}$ of the dimming switch 200 is a high level signal. For another example, the charging control module 410 may be configured to control the first current source 600 to stop charging the first capacitor 413 after receiving the second control signal $V_{ZCD}$ from the zero-crossing detector 500 and the voltage of the first capacitor 413 may be $V_{C1}$. The voltage $V_{C1}$ may be used as a reference voltage to determine a max charging voltage of the second capacitor 423.

In some embodiments, the charging control module 410 may be connected to the second current source 650 and the second capacitor 423 for controlling charging states of the second capacitor 423. The second current source 650 may be connected to the second capacitor 423 for charging the second capacitor 423. Until the voltage comparison module 470 determines that a voltage $V_{C2}$ of the second capacitor 423 equals to the voltage $V_{C1}$ of the first capacitor 413, the second current source 650 may not stop charging the second capacitor 423.

The voltage comparison module 470 may be connected to the first capacitor 413 and the second capacitor 423. The voltage comparison module 470 may be configured to compare the voltage $V_{C1}$ of the first capacitor 413 with the voltage $V_{C2}$ of the second capacitor 423 and sent a first control signal $V_{SET}$ to the switch control sub-circuit 300 when the voltage $V_{C2}$ of the second capacitor 423 equals to the voltage $V_{C1}$ of the first capacitor 413.

In some embodiments, a difference between a charging time of the second capacitor 423 and a charging time of the first capacitor 413 may be equal to a preset time period. The preset time period may be a delay time of a switching cycle.

By controlling a current $I_{dim}$ of the second current source 650 for charging the second capacitor 413, the charging time of the second capacitor 423 may be adjusted and the preset time period may be adjusted. In some embodiments, capacitance $C_1$ of the first capacitor 413 may be equal to a capacitance $C_2$ of the second capacitor 423, to ensure the charging time of the first capacitor 413 always equals to the charging time of the second capacitor 423, the current $I_R$ of the first current source 600 may be set to be greater than the current $I_{dim}$ of the second current source 650.

Figure 5:
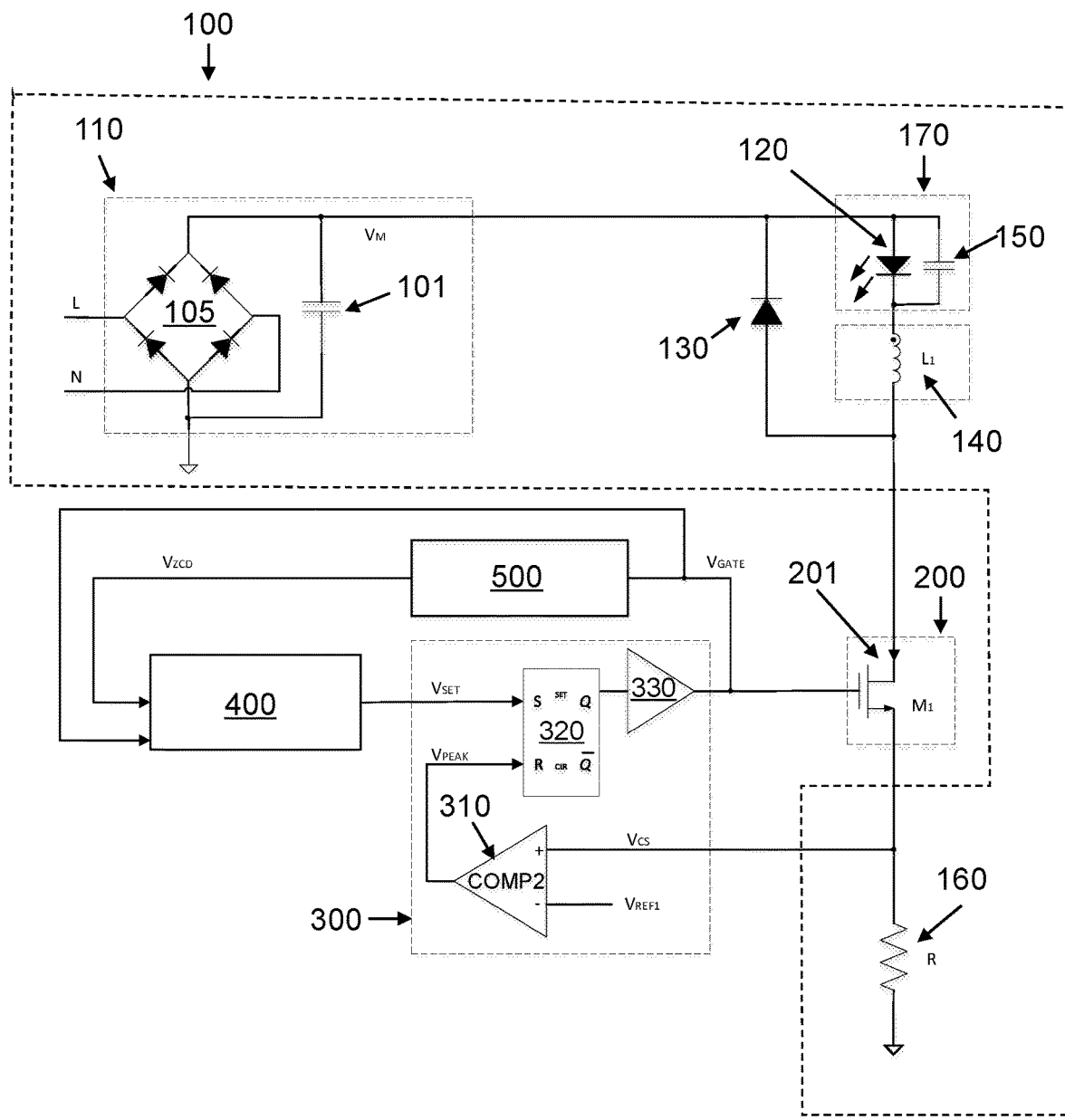
FIG. 5 is a schematic diagram illustrating an exemplary current adjustment circuit according to some embodiments of the present disclosure.

In some embodiments, in the DCM dimming mode, an average current of the current adjustment circuit 10 (i.e., an average current of the lighting sub-circuit 100, or an average current of the LED module 170) may be determined according to the following equation (1):

$$I_{AVG} = \frac{1}{2} \times \frac{V_{REF}}{R} \times \frac{T_{ON} + T_{dmg}}{T}, \qquad (1)$$

where $I_{AVG}$ refers to the average current in the current adjustment circuit 10, $V_{REF}$ refers to a threshold voltage in the current adjustment circuit 10, R refers to a resistance of a current sense resistor (e.g., a current sense resistor 160 as shown in FIG. 5) of the current adjustment circuit 10, $T_{ON}$ refers to conduction time (e.g., on time) of the current adjustment circuit 10 in a switching cycle, i.e., a time period in an energy storage phase, $T_{dmg}$ refers to a time period of an energy release phase of the inductor 140 after the current adjustment circuit 10 is turned off during the switching cycle of the current adjustment circuit 10, T refers to a time of the switching cycle of the current adjustment circuit 10.

In some embodiments, a threshold voltage of the current adjustment circuit 10 may be a peak voltage that the current adjustment circuit 10 may reach. Then $$\frac{V_{REF}}{R}$$

may refer to a peak current $I_{peak}$ of inductor current $I_L$ of the inductor 140 disposed in the current adjustment circuit 10.

Referring now to FIG. 4A, $T_{ON}$ may refer to the conduction time (e.g., on time) of the current adjustment circuit 10 in the switching cycle, i.e., the time period of the energy storage phase of the inductor 140. $T_{dmg}$ may refer to the time period of the energy release phase of the inductor 140 after the current adjustment circuit 10 is turned off during the switching cycle of the current adjustment circuit 10. $T_{OFF}$ may refer to the time period of zero-crossing phase in which a current of the inductor 140 is zero. Time of the switching cycle T of the current adjustment circuit 10 may be a sum of the time period of the energy storage phase $T_{ON}$, the time period of the energy release phase $T_{dmg}$, and the time period of the zero-crossing phase $T_{OFF}$, i.e., $T=T_{ON}+T_{dmg}+T_{OFF}$.

As shown in equation (1), the average current $I_{AVG}$ in the current adjustment circuit 10 may be positively correlated with $$\frac{T_{ON} + T_{dmg}}{T}$$

(i.e., a duty ratio of the current of the inductor 140). By controlling the time period of the zero-crossing phase $T_{OFF}$, the average current $I_{AVG}$ in the current adjustment circuit 10 may be adjusted. By controlling a sum of the time period of the energy storage phase $T_{ON}$ and the time period of the energy release phase $T_{dmg}$, the time period of the zero-crossing phase $T_{OFF}$ may be controlled. As is known to all, charging a capacitor with a constant current, a voltage of the capacitor may be proportional to a charging time of the capacitor. In some embodiments, time calculating may be achieved by controlling charging states of the first capacitor 413 and the second capacitor 423. For example, the charging time of the first capacitor 413 may be set to be equal to a period in which the current of the inductor 140 is not zero, i.e., the sum of the time period of the energy storage phase $T_{ON}$ and the time period of the energy release phase $T_{dmg}$. The charging time of the second capacitor 423 may be set to be equal to the time of the switching cycle T of the current adjustment circuit 10. Accordingly, different charging times of the capacitors may denote different time periods in the current adjustment circuit 10. The above process may be determined according to the following equations:

$$T_{on} + T_{dmg} = \frac{C_1}{I_R} \times V_{c1}, \quad (2)$$

$$T = \frac{C_2}{I_{dim}} \times V_{c1}, \quad (3)$$

where $I_{dim}$ refers to the current of the second current source 650, $I_R$ refers to the current of the first current source 600, and Vo1 refers to a voltage of the first capacitor 413.

The average current $I_{AVG}$ of the current adjustment circuit 10 may be determined by incorporating equation (2) and equation (3) into equation (1), resulting in equation (4) as follows:

$$I_{AVG} = \left(\frac{1}{2} \times \frac{V_{REF}}{R} \times \frac{C_1}{C_2} \times \frac{1}{I_R}\right) I_{dim}. \quad (4)$$

According to equation (4), the capacitance $C_1$ of the first capacitor 413 and the capacitance $C_2$ of the second capacitor 423 may be preset fixed values. The resistance R of the current sense resistor 160 of the current adjustment circuit 10, the current $I_R$ of the first current source 600, and the threshold voltage $V_{REF}$ in the current adjustment circuit 10 may also be preset constants. The only remaining variable in equation (4) may be $I_{dim}$. The current adjustment circuit 10 provided by embodiments of the present disclosure may simplify factors that affected the current in the current adjustment circuit 10, thereby realize that adjusting a luminous intensity of light sources in the current adjustment circuit 10 by adjusting the only remaining variable $I_{dim}$, and consistency of the LED light sources may be improved.

In some embodiments, $I_{dim}$ may be a proportional copy to $I_R$ (i.e., $I_{dim}=K \cdot I_R$), where K is greater than or equal to 0. Substituting $I_{dim}=K \cdot I_R$ into equation (4), the average current $I_{AVG}$ in the current adjustment 10 may be determined as follows:

$$I_{AVG} = \left(\frac{1}{2} \times \frac{V_{REF}}{R} \times \frac{C_1}{C_2} \times \frac{1}{I_R}\right) I_{dim} = \left(\frac{1}{2} \times \frac{V_{REF}}{R} \times \frac{C_1}{C_2}\right) \times K. \quad (5)$$

According to equation (5), the average current of the LED (i.e., the average current $I_{AVG}$ in the current adjustment circuit 10) may relate to the capacitance $C_1$ of the first capacitor 413, the capacitance $C_2$ of the second capacitor 423, the threshold voltage $V_{REF}$ in the current adjustment circuit 10, the resistance R of the current sense resistor 160, and the proportional coefficient K. A ratio of capacitance $C_1$ of the first capacitor 413 and the capacitance $C_2$ of the second capacitor 423, the threshold voltage $V_{REF}$ in the current adjustment circuit 10, and the resistance R of current sense resistor 160 may be high precision parameters. Therefore, the average current $I_{AVG}$ in the current adjustment circuit 10 may be adjusted by adjusting the proportional coefficient K, thereby realize that adjusting the brightness of the LED light source in a high precision means, and ensure the consistency of the LED light sources.

It should be noted that the above descriptions of the charge time control sub-circuit 400 and its sub-circuits are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, capacitances of the first capacitor and the second capacitor may be the same or different. Additionally, or alternatively, one or more components of the noise control system described above may be omitted or divided into more than one component. For example, the charging control module 410 may be divided into a first charging control module 491 and a second charging control module 492. As shown in FIG. 3B, the charge time control sub-circuit 400 may include the first current source 600, the second current source 650, the first capacitor 413, the second capacitor 423, the first charging control module 491, the second charging control module 492, and the voltage comparison module 470. The first charging control module 491 may be configured to receive the control terminal signal $V_{GATE}$ of the dimming switch 200 and the second control signal $V_{ZCD}$, and be connected to the first current source 600 and the first capacitor 413 for controlling charging states of the first capacitor 413. The second charging control module 492 may be configured to receive the control terminal signal $V_{GATE}$ of the dimming switch 200 and be connected to the second current source 650 and the second capacitor 423 for controlling charging states of the second capacitor 423.

Figure 4B:
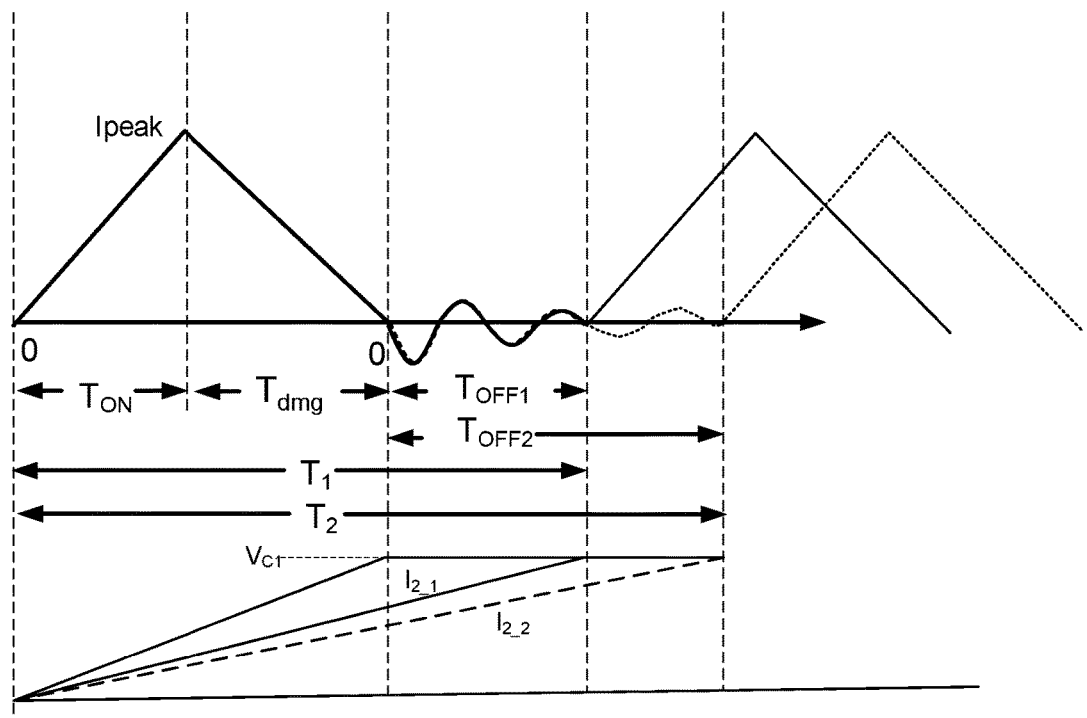

FIGS. 4A and 4B are timing diagram illustrating switching cycles of an exemplary current adjustment circuit 10 according to some embodiments of the present disclosure. Each switching cycle (e.g., switching cycles 4001, 4002, and 4003) may include an energy storage phase (e.g., $T_{ON}$), an energy release phase (e.g., $T_{dmg}$), and a zero-crossing phase (e.g., $T_{OFF}$). A sum time of each of the switching cycles may be $T=T_{ON}+T_{dmg}+T_{OFF}$. More descriptions regarding the switching cycle may be found elsewhere in the present disclosure. See, e.g., FIGS. 3A, 3B and 7 and relevant descriptions thereof.

As shown in FIG. 4B, a voltage of the first capacitor 413 may be $V_{C1}$ at an end time of the energy release phase (i.e., a start time of the zero-crossing phase). By adjusting a charging current of the second capacitor 423, a sum time of a switching cycle may be controlled. For example, a charging current of the second capacitor 423 may be $I_{2\_1}$ and a corresponding switching cycle may be $T_{ON}+T_{dmg}+T_{OFF1}$. For another example, a charging current of the second capacitor 423 may be $I_{2\_2}$ and a corresponding switching cycle may be $T_{ON}+T_{dmg}+T_{OFF2}$. By using a smaller charging current, the switching cycle may be longer, and an average current of the inductor may be smaller.

FIG. 5 is a schematic diagram illustrating an exemplary current adjustment circuit 10 according to some embodiments of the present disclosure. The current adjustment circuit 10 may include the lighting sub-circuit 100, the dimming switch 200, the switch control sub-circuit 300, the charge time control sub-circuit 400, and the zero-crossing detector 500.

The lighting sub-circuit 100 may include the rectifying module 110, a diode 130, the inductor 140, a current sense resistor 160, and the LED module 170. The rectifying module 110 may be configured to convert alternating current (AC) to direct current (DC). In some embodiments, the rectifying module 110 may include a capacitor 101 and a bridge rectifier 105. The LED module 170 may include a LED 120 and a capacitor 150. The capacitor 150 may be parallel to the LED 120. The LED module 170 may be powered by the rectifying module 110. The inductor 140 may be connected to the LED module 170 and the dimming switch 200. The inductor 140 may be used as an energy storage inductor working in three time periods in a switching cycle: the time period $T_{OFF}$ of the zero-crossing phase, the time period $T_{dmg}$ of the energy release phase, and the time period $T_{ON}$ of the energy storage phase. The diode 130 may parallel to a combination circuit of a series connection of the LED module 170 and the inductor 140.

The dimming switch 200 may include a first switch 201. The first switch 201 may include a gate, a source, and a drain. The gate of the first switch 201 may be a control terminal of the first switch 201. The drain of the first switch 201 may be connected to the inductor 140. The source of the first switch 201 may be connected to the switch control sub-circuit 300 through a driver 330 disposed in the switch control sub-circuit 300. The source of the first switch 201 may be connected to the current sense resistor 160 and be connected to the switch control sub-circuit 300 through a second comparator 310 disposed in the switch control sub-circuit 300. In some embodiments, the first switch 201 may be an NMOS (N-channel Metal Oxide Semiconductor).

The switch control sub-circuit 300 may include a second comparator 310, a flip flop 320, and a driver 330. The flip flop 320 may include an RS type flip flop. The flip flop 320 may include a Q end, a Q end, an S end, and an R end. The Q end of the flip flop 320 may be connected to the driver 330. The R end of the flip flop 320 may be connected to the second comparator 310 for receiving an output signal $V_{PEAK}$ of the second comparator 310. The S end of the flip flop 320 may be connected to the charge time control sub-circuit 400 for receiving an output signal $V_{SET}$ (i.e., the first control signal $V_{SET}$) of an inventor 440 disposed in the charge time control sub-circuit 400. The second comparator 310 may be configured to compare a reference voltage $V_{REF1}$ with a voltage $V_{CS}$. The voltage $V_{CS}$ may be a voltage at a connection point of the source of the first switch 201 and the current sense resistor 160. A first input end of the second comparator 310 may be connected to the reference voltage $V_{REF1}$ and a second input end of the second comparator 310 may be connected to the connection point of the first switch 201 and the current sense resistor 160. The current sense resistor 160 may be connected to ground.

The switch control sub-circuit 300 may be configured to control the dimming switch 200 (i.e., the first switch 201) based on the first control signal $V_{SET}$ and the voltage $V_{CS}$. Detailed descriptions regarding the controlling the dimming switch 200 by the switch control sub-circuit 300 may be found elsewhere in the present disclosure. See, e.g., FIGS. 6A and 6B and relevant descriptions thereof.

Figure 6A:
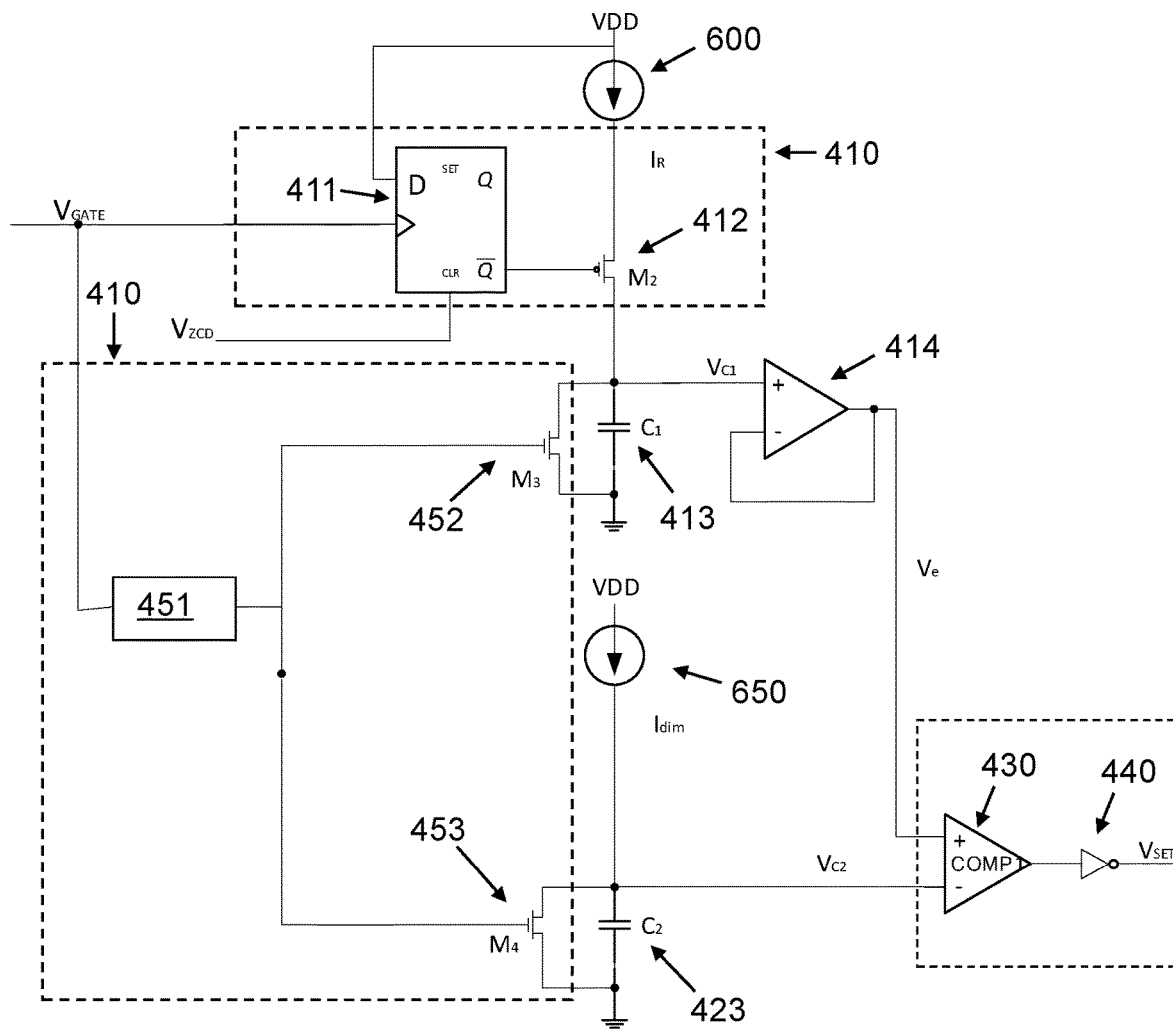
FIGS. 6A and 6B are schematic diagrams illustrating exemplary charge time control sub-circuits according to some embodiments of the present disclosure.
Figure 6B:
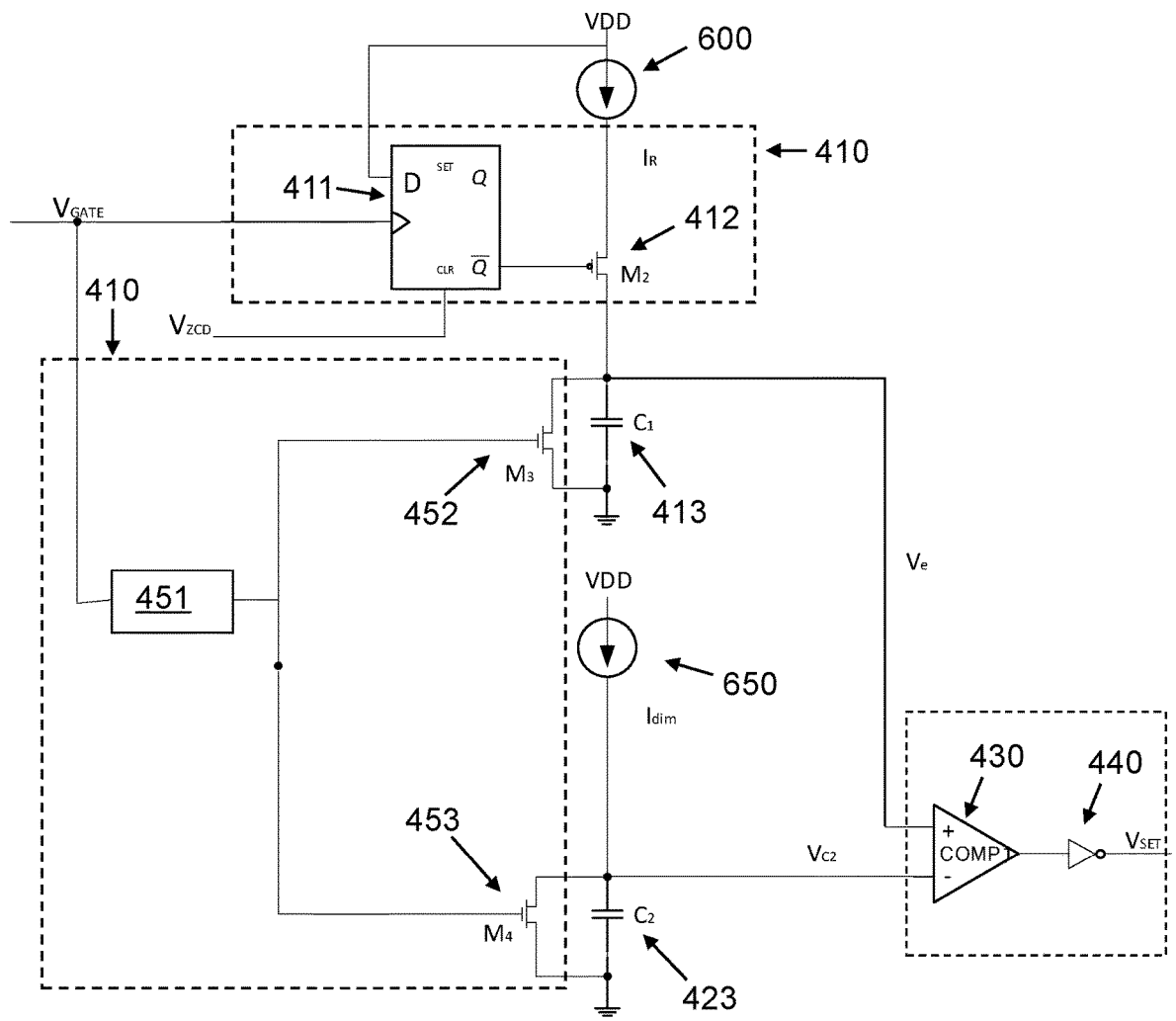

FIGS. 6A and 6B are schematic diagrams illustrating exemplary charge time control sub-circuits 400 according to some embodiments of the present disclosure. As shown in FIG. 6A, the charge time control sub-circuit 400 may include the charging control module 410, the first capacitor 413, the first current source 600, the second capacitor 423, the second current source 650, an operational amplifier 414, a discharge sub-circuit 450, and the voltage comparison module 470.

The charging control module 410 may include a flip flop 411, and a second switch 412. The second switch 412 may be a PMOS (Positive channel Metal Oxide Semiconductor). The second switch 412 may include a drain, a source, and a gate. The gate of the second 412 may be a control terminal and be connected to a 1:7 end of the flip flop 411. The drain of the second switch 412 may be connected to the first current source 600. The source of the second switch 412 may be connected to the first capacitor 413. A D end of the flip flop 411 may be connected to a voltage input end of the first current source 600 for keeping the D end in high level. Referring to FIGS. 5, 6A, and 6B, a trigger end of the flip flop 411 may be connected to the control terminal of the second switch 412. When the control terminal of the second switch 412 outputs a high level signal, the Q end of the flip flop 411 may output a low-level signal, the second switch 412 may be turned on, then the first charge source 600 may begin to charge the first capacitor 413. A reset end (e.g., CLR) of the flip flop 411 may be connected to the zero-crossing detector 500 for receiving a second control signal $V_{ZCD}$. When the zero-crossing detector 500 detects that the second switch 412 is in a zero-crossing state, the zero-crossing detector 500 may send the second control signal $V_{ZCD}$, then the flip flop 411 may reset, the $\overline{Q}$ end of the flip flop 411 may output a high level signal, then the second switch 412 may be turned off and the first current source 600 stops charging the first capacitor 413.

The charging control module 410 may be connected to the first current 600 and the first capacitor 413 for controlling charging states of the first capacitor 413. The first capacitor 413 may be charged by the first current source 600 with a current $I_R$ and the second capacitor 423 may be charged by the second current source 650 with a current $I_{dim}$.

The voltage comparison module 470 may include a first comparator 430 and an inverter 440. The first comparator 430 may be configured to compare a voltage of the first capacitor 413 and a voltage of the second capacitor 423. The first comparator 430 may receive the voltage of the first capacitor 413 and the voltage of the second capacitor 423 directly or indirectly. For example, an operational amplifier (e.g., the operational amplifier 414) may be disposed between the first capacitor 413 and the first comparator 430, and that may result in the first comparator 430 to receive the voltage of the first capacitor 413 indirectly. An output end of the first comparator 430 may be connected to the inverter 440 for generating a first control signal $V_{SET}$. The first control signal $V_{SET}$ may further be used as an input signal of the switch control sub-circuit 300. In some embodiments, when the voltage of the first capacitor 413 equals to the voltage of the second capacitor 423, the first comparator 430 may output a negative signal. The negative signal may be sent to the inverter 440 to generate a positive signal. In such a situation, the first control signal $V_{SET}$ may be a positive signal.

The operational amplifier 414 may be disposed between the first capacitor 413 and the first comparator 430. The operational amplifier 414 may be configured to output a voltage $V_e$ that is equal to a voltage Vol of the first capacitor.

By using the operational amplifier 414, the effects from the second capacitor 423 to the voltage Vol of the first capacitor may be reduced or eliminated. That is to say, a main function of the operational amplifier 414 may be signal isolation. Any circuit which provides a signal isolation effect may be employed by the charge time control sub-circuit 400. Embodiments described in the present disclosure are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, an operational amplifier may be disposed between the second capacitor 423 and the first comparator 430. For another example, two operational amplifiers may be employed in the charge time control sub-circuit 400 by placing one operational amplifier between the first capacitor 413 and the first comparator 430 and placing the other operational amplifier between the second capacitor 423 and the first comparator 430.

The discharge sub-circuit 450 may be configured to control discharging of the first capacitor 413 and the second capacitor 423. The discharge sub-circuit 450 may include a controller 451, a third switch 452, and a fourth switch 453. The controller 451 may be connected to a control terminal of the third switch 452 and a control terminal of the fourth switch 453, respectively. The third switch 452 may be connected to the first capacitor 413 in parallel. The fourth switch 453 may be connected to the second capacitor 423 in parallel.

The controller 451 may receive an input signal from the control terminal of the first switch 201. The input signal may be the control terminal signal $V_{GATE}$ of the first switch 201. When the control terminal signal $V_{GATE}$ of the first switch 201 is a high level signal, the controller 451 may turn on the third switch 452 and the fourth switch 453 in a preset discharging time period for fully discharging the first capacitor 413 and the second capacitor 423. After fully discharging the first capacitor 413 and the second capacitor 423, a new charging cycle for the first capacitor 413 and the second capacitor 423 may be started. The first current source 600 and the second current source 650 may recharge the first capacitor 413 and the second capacitor 423 when charges of the first capacitor 413 and the second capacitor 423 are both zero. Time for discharging the first capacitor 413 and the second capacitor 423 may be very short, and its affection on the time of the switching cycle T of the current adjustment circuit 10 may be ignored. It should be known that any circuit that can detect a high level signal of the first switch 201 and drive the third switch 452 and the fourth switch 453 to turn on may be employed as the controller 451. Descriptions of the embodiments of the present disclosure about the circuit of the controller 451, which are provided in the reference drawings, are not intended to limit the scope of the present disclosure, but only the selected embodiments of the present disclosure. Based on the embodiments of the present disclosure, each of the other embodiments obtained by those skilled in the art without creative efforts shall be bound to the scope of the present disclosure.

The current adjustment circuit 10 provided in the present disclosure may adjust the current $I_{dim}$ when the second current source 650 charges the second capacitor 423, thereby realize adjusting a proportion between $T_{ON}+T_{dmg}$ (i.e., a sum of the time period of the energy storage phase and the time period of the energy release phase) and $T_{OFF}$ (i.e., the time period of the zero-crossing phase) in a switching cycle T of the current adjustment circuit 10, as a result, an average current of the current adjustment circuit 10 and a luminous intensity of a light source in the current adjustment circuit 10 may be adjusted.

Referring to FIGS. 5 and 6, in a switching cycle T of the current adjustment circuit 10, when the first switch 201 turns on, a current may pass through the LED module 170, the inductor 140, the first switch 201, and the current sense resistor 160. The current adjustment circuit 10 may be in an energy storage phase. As the current in the first switch 201 and the current sense resistor 160 gradually increases, the voltage of two ends of the current sense resistor 160 may also gradually increase. When the voltage $V_{CS}$ equals to the reference voltage $V_{REF1}$, the second comparator 310 may send a positive signal (i.e., $V_{PEAK}$) to the R end of the flip flop 320. Based on a control logic of the flip flop 320, the Q end of the flip flop 320 may send a negative signal to the driver 330, and the driver 330 may turn off the first switch 201. At this time, the first capacitor 413 and the second capacitor 423 may still be in a charging state and the current adjustment circuit 10 begins an energy release phase. During the energy release phase of the current adjustment circuit 10, a current may pass through the inductor 140, the diode 130, and the LED module 170. When the inductor 140 is fully discharged, the drain of the first switch 201 may generate an oscillating signal. The zero-crossing detector 500 may detect the oscillating signal at the gate of the first switch 201. At this time, the zero-crossing detector 500 may output the second control signal $V_{ZCD}$ and the current adjustment circuit 10 may enter a zero-crossing phase. During the zero-crossing phase, the first current source 600 may stop charging the first capacitor 413 and the second current source 650 may keep charging the second capacitor 423. When voltage $V_{C2}$ of the second capacitor 423 equals to the voltage $V_{C1}$ of the first capacitor 413, the output end of the first comparator 430 may output a negative signal. The negative signal may be converted by the inventor 440 and the inventor may output an output signal. The output signal may be the first control signal $V_{SET}$. The charge time control sub-circuit 400 may send the first control signal $V_{SET}$ to the S end of the flip flop 320. After receiving the first control signal $V_{SET}$, the Q end of the flip flop 320 may send a positive signal to the driver 330, the driver 330 may turn on the NMOS, the system enters a next switching phase.

It should be noted that the above descriptions of the current adjustment circuit 10 and sub-circuits in the current adjustment circuit are intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the flip flop 320 and/or the flip flop 411 may also be other types of flip flop (e.g., D flip flop, JK flip flop, or T flip flop). Additionally, or alternatively, one or more components of the noise control system described above may be omitted. For example, the operational amplifier 414 may be omitted. As shown in FIG. 6B, the first capacitor 413 may connected to the first comparator 430 directly. As another example, two or more components of the noise control system may be integrated into a single component. Merely by way of example, the charge time control sub-circuit 400 may be integrated into the switch control sub-circuit 300.

Figure 7:
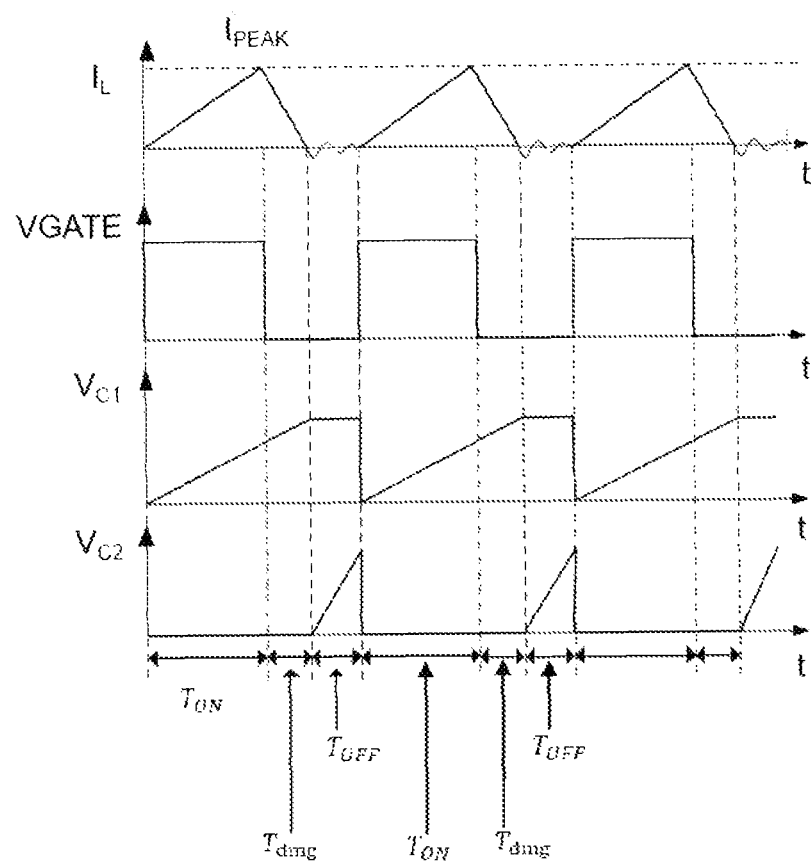
FIG. 7 is a timing diagram illustrating some current nodes and voltage nodes of an exemplary current adjustment circuit according to some embodiments of the present disclosure.

FIG. 7 is a timing diagram illustrating some current nodes and voltage nodes of an exemplary current adjustment circuit 10 according to some embodiments of the present disclosure. As shown in FIG. 7, the charged time of the first capacitor 413 may equal to the sum of the time period of the energy storage phase $T_{ON}$ and the time period of the energy release phase $T_{dmg}$. The charged time of the second capacitor 423 may equal to the time of the switching cycle T ($T=T_{dmg}+T_{ON}\pm T_{OFF}$) of the current adjustment circuit 10. An ending time point of a prior switching cycle of the current adjustment circuit 10 may be a start time of a next switching cycle of the current adjustment circuit 10.

When a switching cycle begins, the control terminal signal $V_{GATE}$ of the first switch 201 may be a high level signal. The first switch 201 may be turned on, and the current adjustment circuit 10 may enter the energy storage phase. The control terminal signal $V_{GATE}$ may be sent to the trigger end of the flip flop 411 in the charge time control sub-circuit 400. After the trigger end of the flip flop 411 receives the high level signal, the D end of the flip flop 411 may keep the high level signal, and the Q end of the flip flop 411 may output a negative signal. Under the control of the negative signal, the second switch 412 in the charge time control sub-circuit 400 may be turned on. At this time, the first current source 600 begins to charge to the first capacitor 413 and the second current source 650 begins to charge the second capacitor 423.

The first current source 600 and the second current source 650 may charge the first capacitor 413 and the second capacitor 423, respectively. When a voltage $V_{CS}$ of the source of the first switch 201 equals to the reference voltage $V_{REF1}$, the second comparator 310 may generate a positive signal (i.e., the output signal $V_{PEAK}$ is a positive signal) to the R end of the flip flop 320. Then, the Q end of the flip flop 320 may output a negative signal, and the driver 330 may receive the negative signal and be configured to control the first switch 201 turns off according to the negative signal. After the first switch 201 turns off, the current $I_L$ of the inductor 140 may begin to decrease, the current adjustment circuit 10 may enter the energy release phase $T_{dmg}$.

When the current $I_L$ of the inductor 140 in the current adjustment circuit 10 gradually decreases to zero, the current adjustment circuit 10 may enter the zero-crossing phase $T_{OFF}$. When the zero-crossing detector 500 detects that the current $I_L$ of the inductor 140 is zero (i.e., detect the oscillating signal at the gate of the first switch 201), the zero-crossing detector 500 may send the second control signal $V_{ZCD}$ to the reset end of the flip flop 411. After the reset end of the flip flop 411 receives the second control signal $V_{ZCD}$, the $\overline{Q}$ end of the flip flop 411 may output a positive signal. The second switch 412 of the charge time control sub-circuit 400 may be turned off, the voltage $V_{C1}$ of the first capacitor 413 may hold in a present value, the voltage $V_e$, which equals to the voltage $V_{C1}$, may be outputted by the operational amplifier 414. During the zero-crossing phase $T_{OFF}$, the second current source 650 may still keep charging the second capacitor 423. When the voltage $V_{C2}$ of the second capacitor 423 equals to the voltage $V_e$, the first comparator 430 may output a negative signal. The negative signal may be converted into a positive signal $V_{SET}$ by the inverter 440. After the S end of the flip flop 320 of the switch control sub-circuit 300 received the positive signal $V_{SET}$, the Q end of the flip flop 320 may output a positive signal to the driver 330, and the driver 330 may be configured to control the first switch 201 turns on. At this time, the current adjustment circuit 10 may re-enter a time period of the energy storage phase $T_{on}$. When the current adjustment circuit 10 enters the next energy storage phase, the controller 451 of the charge time control sub-circuit 400 may receive a high level signal from the control terminal of the first switch 201. After receiving the high level signal, the controller 451 may send a pulse signal to turn off the third switch 452 and the fourth switch 453, so that charges in the first capacitor 413 and the second capacitor 423 may be fully released. At this time, the first current source 600 and the second current source 650 may recharge the first capacitor 413 and the second 423 in a next switching cycle, respectively and immediately.

Based on the above descriptions, the average current $I_{AVG}$ of the current adjustment circuit 10 may be controlled by adjusting the $I_{dim}$ (i.e., the current of the second current source 650). Factors affected the current in the circuit may be simplified to be a single factor. Therefore, the consistency of each LED light source in a lighting circuit may be improved.

Figure 8:
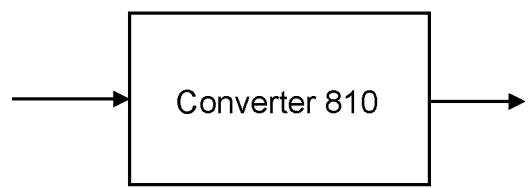
FIG. 8 is a schematic structural diagram illustrating an exemplary converter according to some embodiments of the present disclosure.

FIG. 8 is a schematic structural diagram illustrating an exemplary converter 810 according to some embodiments of the present disclosure. The converter 810 may be configured to receive a dimming signal and determine the current $I_{dim}$ of the second current source 650 based on the dimming signal. The dimming signal may include a digital signal or an analog signal for representing a desired current of the LED module 170. In some embodiments, the dimming signal may include a PWN (Pulse Width Modulation) signal with an adjustable duty ratio, where the duty ratio refers to the desired current of the LED module 170. The converter 810 may convert the received dimming signal into a signal representing a variable output current. The variable output current may be the current of the second current source 650 for charging the second capacitor 423. The converter 810 may be a digital-analog converter (DAC), an analog-digital converter (ADC), or a combination of a DAC and an ADC.

Figure 9:
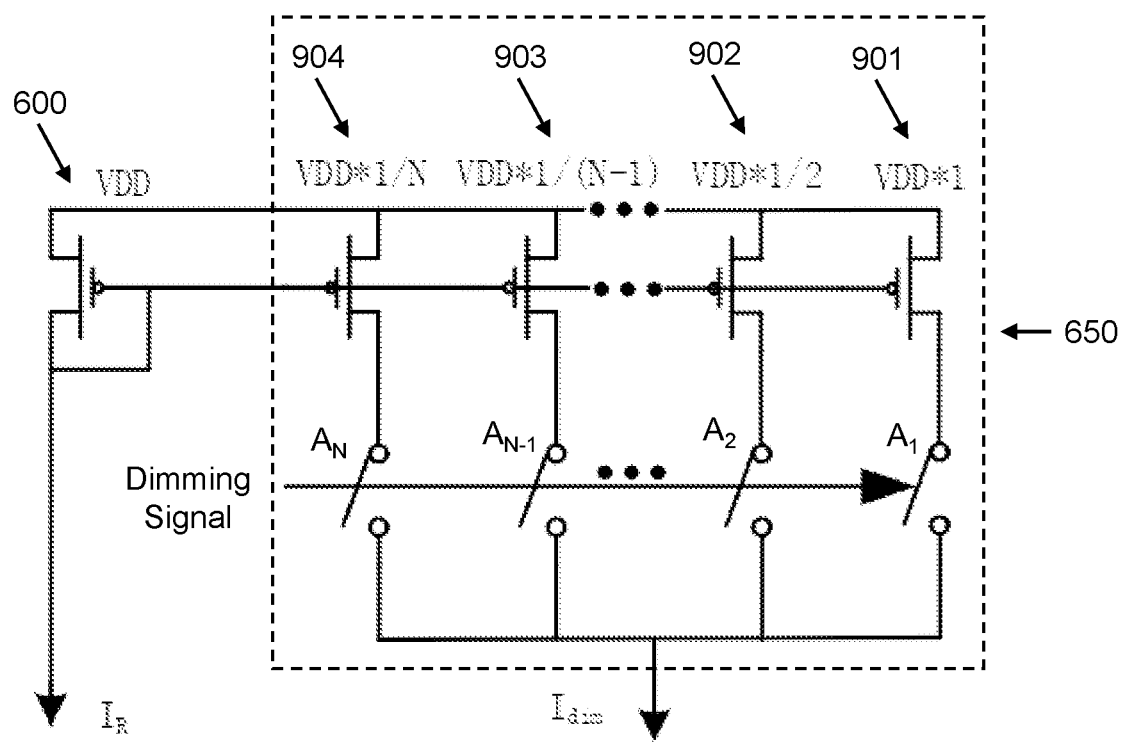
FIG. 9 is a schematic structural diagram illustrating an exemplary current mirror circuit according to some embodiments of the present disclosure.

FIG. 9 is a schematic structural diagram illustrating an exemplary current mirror circuit 900 according to some embodiments of the present disclosure. The current mirror circuit 900 may include a plurality of current mirrors (e.g., 901, 902, 903, and 904) and each of the plurality of current mirrors may correspond to a control switch (e.g., $A_1$, $A_2$, $A_{N-1}$, and $A_N$). A first current source 600 (i.e., current source VDD) in the current mirror circuit 900 may supply a current $I_R$. The current of a second current source 650 may be $I_{dim}$ and $I_{dim}=k \cdot I_R$.

In some embodiments, the proportional coefficient K may be controlled to be equal to a preset value according to a dimming signal. The dimming signal may be a digital signal. The current $I_{dim}$ of the second current source 650 may be obtained by copying the current $I_R$ of the first current source 600 (i.e., $I_{dim}=k \cdot I_R$). Based on the dimming signal, states (a turn-on state or a turn off state) of the plurality of control switches may be determined. By controlling the states of the plurality of control switches, the proportional coefficient K may be determined and $I_{dim}$ may be generated.

In a dimming scenario, according to the received dimming signal, the corresponding proportional coefficient K may be determined by switching on at least one of the plurality of control switches. Based on the at least one turned on control switch, the $I_{dim}$ may be determined and a luminous intensity may be adjusted. The preset dimming lighting control signal may be a digital signal, a PWN signal, or an analog signal.

Finally, it should be noted that the above-mentioned embodiments are merely exemplary embodiments of the present disclosure, and are used to explain the technical solutions of the present disclosure but not limited thereto. The scope of protection of the present disclosure is not limited thereto, although the present disclosure has described in detail with reference to the foregoing embodiments. It should be understood: any person skilled in the art may revise the technical solutions described in the foregoing embodiments or may easily make changes in the technical scope disclosed in the present disclosure, or equivalently replace some of the technical features. Such modifications, changes, and substitutions do not depart from the spirit and scope of the technical solutions of the present disclosure and should be covered by the scope of the present disclosure. Therefore, the scope of protection of the present disclosure should be subject to the scope of the claims.

What is claimed is:

1. A circuit for adjusting current, the circuit comprising:
a dimming switch coupled to an inductor disposed in a lighting sub-circuit, wherein the dimming switch is configured to control power supply states of the inductor;
a zero-crossing detector configured to detect an ending time of a current of the inductor, and to generate a zero-crossing signal; and
a time control sub-circuit including a first capacitor and a second capacitor and configured to receive the zero-crossing signal, and to generate a control signal that is configured to control the dimming switch to initiate a switching cycle for the inductor; wherein the switching cycle starts after a delay time, and the delay time is controlled by a first charging time of the first capacitor and a second charging time of the second capacitor.

2. The circuit of claim 1, wherein an average current through the lighting sub-circuit is based on a first ratio of the delay time and the switching cycle.

3. The circuit of claim 2, wherein a luminous intensity of a light source in the lighting sub-circuit is based on the average current through the lighting sub-circuit.

4. The circuit of claim 2, wherein the first capacitor is charged by a first current source and the second capacitor is charged by a second current source, and the first ratio of the delay time and the switching cycle is based on a second ratio of a first current of the first current source and a second current of the second current source.

5. The circuit of claim 4, wherein the second current source include a plurality of current mirrors corresponding to a plurality of switches, and the second ratio of the first current and the second current is controlled by the plurality of switches.

6. The circuit of claim 1, further comprising a first comparator configured to compare a second voltage of the second capacitor with a first voltage of the first capacitor, wherein
the second current source stops charging the second capacitor when the second voltage is equal to the first voltage.

7. The circuit of claim 1, wherein the delay time is equal to a difference of the first charging time of the first capacitor and the second charging time of the second capacitor.

8. The circuit of claim 1, further comprising a discharge sub-circuit configured to control discharging of the first capacitor and the second capacitor.

9. The circuit of claim 1, further comprising a resistor disposed between the dimming switch and the ground, and a second comparator configured to compare a third voltage of the resistor with a reference voltage, wherein
the dimming switch switches to turn off when the third voltage is equal to the reference voltage.

10. The circuit of claim 1, wherein the dimming switch includes an N-channel Metal Oxide Semiconductor.

11. The circuit of claim 1, further comprising a converter configured to determine the second current of the second current source based on a dimming signal.

12. A method for adjusting a current of a lighting sub-circuit, the method comprising:
detecting an ending time of a current of an inductor disposed in the lighting sub-circuit and generating a zero-crossing signal with a zero-crossing detector; and
in response to the zero-crossing signal, generating, with a time control sub-circuit, a control signal that is configured to control a dimming switch to initiate a switching cycle for the inductor; wherein
the time control sub-circuit has a first capacitor and a second capacitor,
the switching cycle starts after a delay time, and the delay time is controlled by a first charging time of the first capacitor and a second charging time of the second capacitor.

13. The method of claim 12, wherein an average current through the lighting sub-circuit is based on the first ratio of the delay time and the switching cycle.

14. The method of claim 13, wherein a luminous intensity of a light source in the lighting sub-circuit is based on the average current through the lighting sub-circuit.

15. The method of claim 12, further comprising:
comparing a second voltage of the second capacitor with a first voltage of the first capacitor; and
stopping charging the second capacitor when the second voltage is equal to the first voltage.

16. The method claim 12, wherein the delay time is equal to a difference of the first charging time of the first capacitor and the second charging time of the second capacitor.

17. The method of claim 12, further comprising:
controlling, by a discharge sub-circuit, discharging of the first capacitor and the second capacitor.

18. The method of claim 12, further comprising:
comparing a third voltage of a resistor disposed between the dimming switch and the ground with a reference voltage; and
switching off the dimming switch when the third voltage is equal to the reference voltage.

19. The method of claim 12, wherein the dimming switch includes an N-channel Metal Oxide Semiconductor.

20. The method of claim 12, further comprising determining, by a converter, the second current of the second current source based on a dimming signal.

* * * * *